LOGICAL GATING AND ROUTING CIRCUIT

Filed Oct. 23, 1962 2 Sheets-Sheet 1

INVENTOR.
HERBERT ZIMMERMAN
BY Wade Koontz and Martin J. Hunnegan
ATTORNEYS

June 22, 1965 H. ZIMMERMAN 3,191,067

LOGICAL GATING AND ROUTING CIRCUIT

Filed Oct. 23, 1962 2 Sheets-Sheet 2

INVENTOR.
HERBERT ZIMMERMAN
BY Wade Koontz and
Martin J Finnegan
ATTORNEYS

United States Patent Office 3,191,067
Patented June 22, 1965

3,191,067

LOGICAL GATING AND ROUTING CIRCUIT

Herbert Zimmerman, Philadelphia, Pa., assignor to the United States of America as represented by the Secretary of the Air Force Filed Oct. 23, 1962, Ser. No. 232,631
1 Claim. (Cl. 307—88.5)

This invention relates to digital control circuits, and more particularly to a switching-type gating and information routing circuit.

Switching circuits are used extensively in digital computers to perform functions of limiting, triggering, gating, and signal routing. Because of their wide use, any improvement in their method of operation which causes more reliable operation is of great value in the digital logic field.

The usual type of gating circuitry makes use of information pulses occurring in time synchronism and coincident with gating pulses. As a result, any stray noise pulses can cause a gate to open and thereby cause erroneous circuit operation. This invention envisions gating signals occurring in synchronism with information pulses, but delayed in time. This would prevent stray noise pulses from inadvertently opening a gate.

It is one object of this invention to provide a more reliable gating circuit by the use of a delay pulse to inhibit a gate, thus preventing any noise or extraneous signal from passing through the gate to cause erroneous operation of the circuit.

Another object of the invention is to route a plurality of information signals appearing on a plurality of inputs into predetermined paths which are selected by the presence or absence of the information signals themselves on the control input paths.

Another object of the invention is to provide an improved delay device.

Another object of the invention is to provide an im proved delayed coincidence circuit.

According to a preferred embodiment of the present invention, a gating signal is used to trigger a monostable multivibrator, the unstable state of which is used to inhibit all gates of a number of gated amplifiers for a delay time determined by the duration of the unstable state of the multivibrator; any noise on the gating signal is therefore prevented from causing erroneous circuit operation.

Figure 1:
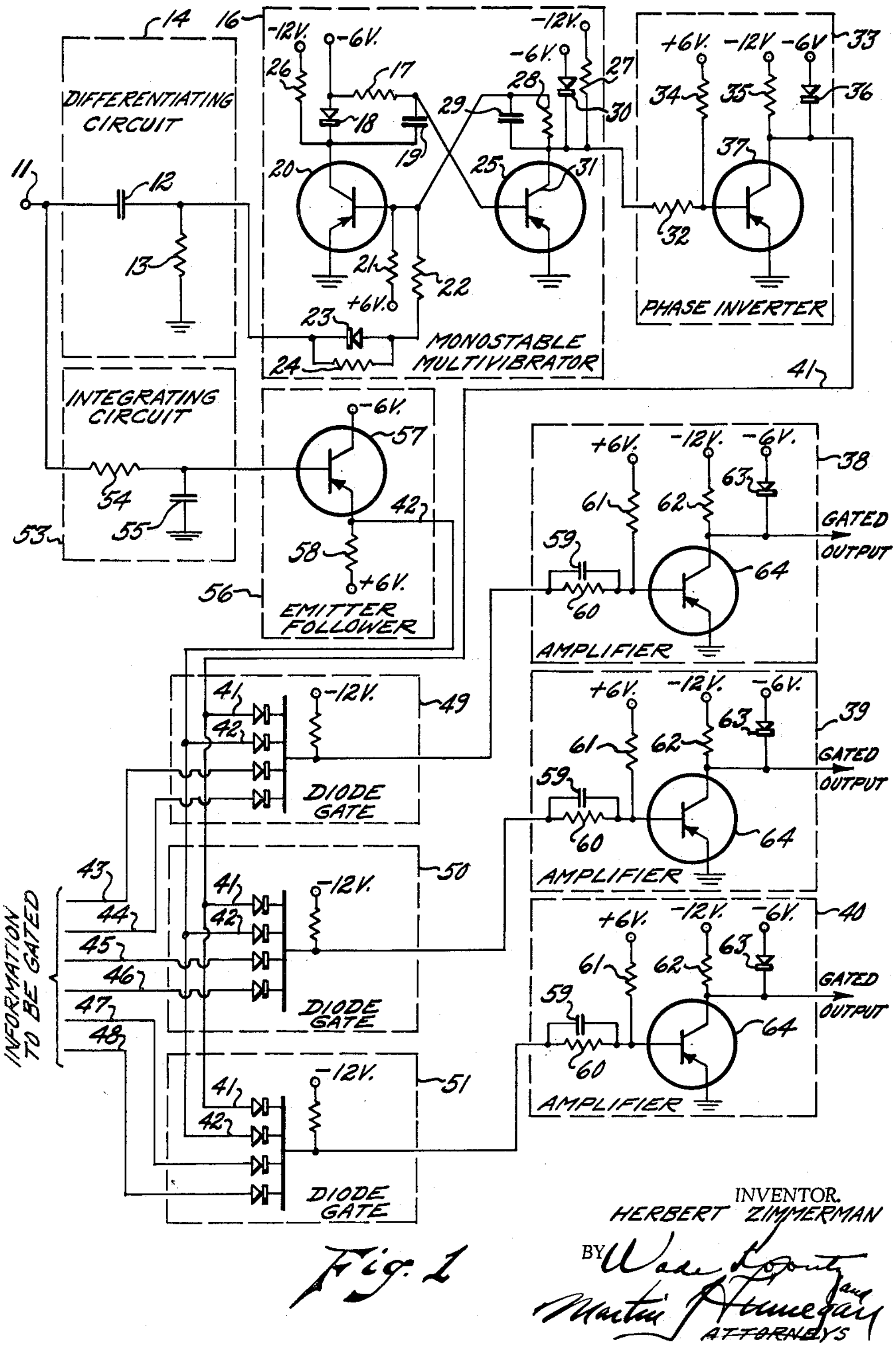
FIG. 1 is a schematic of the logical gating and routing circuit embodying principles of the invention.

In FIG. 1, a negative gating signal is applied to a differentiating circuit 14 composed of capacitor 12 and grounded resistor 13. The output of the differentiating circuit is connected through diode 23 and resistor 24 in parallel, through resistor 22 to a monostable multivibrator 16, composed of transistors 20 and 25, load resistors 26 and 27, biasing resistor 21, one cross coupling network composed of capacitor 19, resistor 17, and diode 18, the other coupling network composed of resistor 28 and capacictor 29, and clamping diode 30.

The output of the multivibrator is taken from the collector 31 of transistor 25 and is fed through resistor 32 to phase inverter circuit 33 composed of biasing resistor 34, load resistor 35, clamping diode 36, and transistor 37. The positive output of the inverter is one of the inputs 41 to each of the diode gates 49, 50, and 51 of amplifiers 38, 39, and 40.

The negative gating signal is also integrated by integrating circuit 53 composed of resistor 54 and capacitor 55; the signal is then fed to emitter follower 56 composed of transistor 57 and resistor 58, which provides a second input 42 to the diode gates 49, 50, and 51 of amplifiers 38, 39, and 40.

Coincident negative information pulses provide another input to the diode gates 49, 50, and 51. These pulses appear on lines 43 and 44, 45 and 46, or 47 and 48

The output of the diode gates is applied through a parallel combination of resistor 60 and capacitor 59 to the base of identical transistor amplifiers 38, 39, and 40, made up of a biasing resistor 61, transistor 64, load resistor 62, and clamping diode 63. The output of each amplifier is used to operate succeeding circuitry.

The operation of the circuit can best be explained by reference to the timing diagram, FIG. 2, along with the schematic diagram in FIG. 1.

Figure 2:
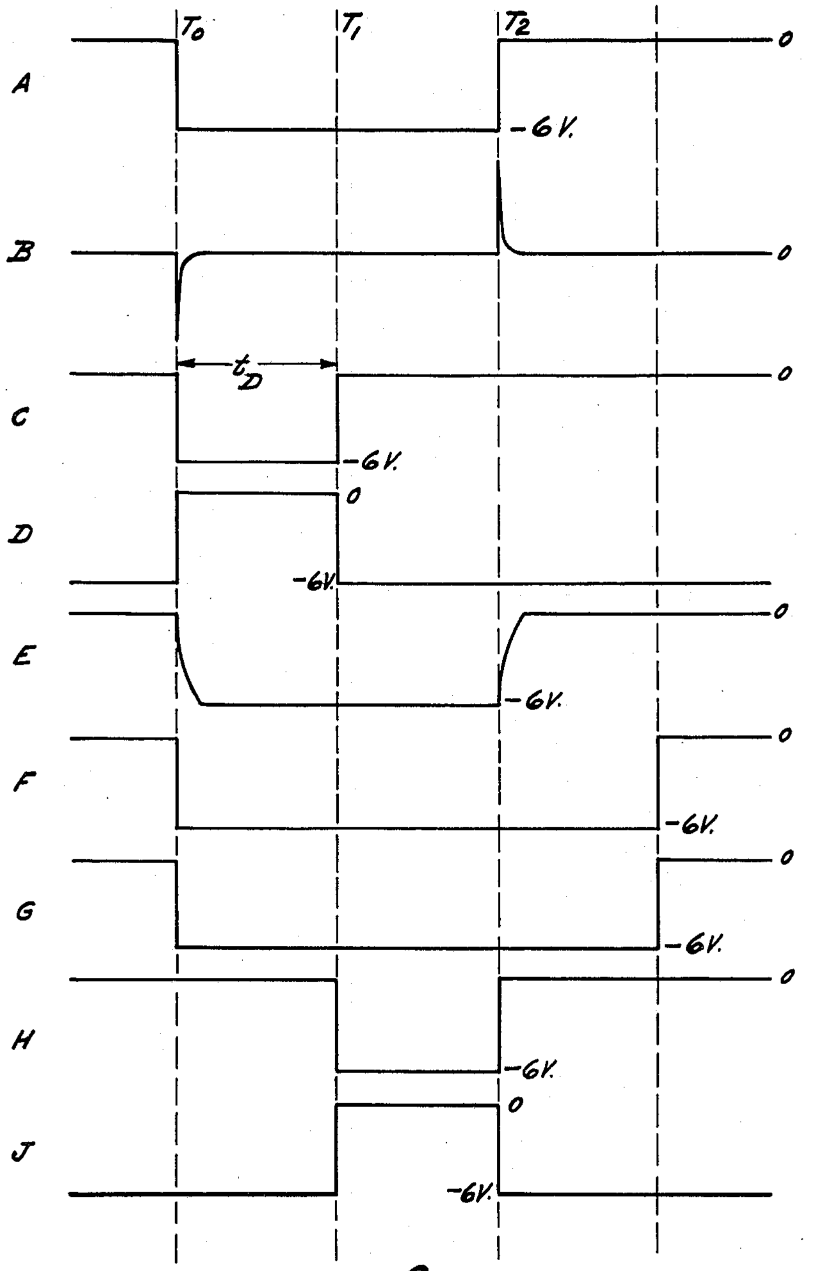
FIG. 2 shows the waveforms to a common time base at various points throughout the circuit of FIG. 1.

A negative gating signal A, FIG. 2, is applied to capacitor 12 of the differentiating circuit at time $t_0$; this circuit produces a negative and positive pulse at times $t_0$ and $t_2$, as shown in B, FIG. 2. The negative pulse is used to trigger the monostable multivibrator 16, the unstable state of which is a negative pulse of duration $t_D$, which occurs from time $t_0$ to time $t_1$, as shown in C, FIG. 2. The positive pulse from differentiating circuit 14 has no effect on multivibrator 16. The output of multivibrator 16 is applied to the base of transistor 37 of a phase inverter circuit 33; the collector of transistor 37 then produces a pulse with a positive polarity, as shown in D, FIG. 2, which is applied as one input 41 of diode "and" gates 49, 50, and 51.

The negative gating signal is also integrated by integrating circuit 53 and is then fed to emitter follower 56; the waveform of the output of the emitter follower is shown at E, FIG. 2. The emitter follower output is applied as a second input 42 of diode "and" gates 49, 50, and 51.

Negative information pulses appear either on lines 43 and 44, 45 and 46, or 47 and 48. The signals on each pair of lines are co-incident, but only one pair of lines are activated at any instant. In the case shown, negative information signals appear on lines 43 and 44, as shown in F and G, respectively, of FIG. 2. Lines 45 and 46, and 47 and 48 are at zero potential.

The diode gates 49, 50 and 51 are shown in FIG. 1 as a coincidence or "and" circuit with four enabling inputs; these gates function when all inputs are activated by negative voltages to provide a negative voltage as an output; when one or more of the inputs are inactivated or returned to zero, the gate has no output. The outputs of the diode gates 49, 50, and 51 are applied to amplifiers 38, 39, and 40, respectively, which amplify and invert the signal to provide a "not and" function.

Referring to the waveforms of FIG. 2, the negative gating signal at A begins at time $t_0$ and ends at time $t_2$; the use of a monostable multivibrator and phase inverter provides a positive pulse of zero voltage level which begins at time $t_0$ and ends at time $t_1$, as seen at D, FIG. 2. This output is applied to each diode gate; consequently, the diode gate cannot have a signal output until time $t$, when the voltage level from the phase inverter drops to −6 volts. The use of a monostable multivibrator prevents the gate from opening for the delay time $t_D$ of the multivibrator, hence any noise on the gating signal is prevented from passing through the gates and the amplifier.

With negative information signals appearing on lines 43 and 44, shown at F and G of FIG. 2, and with lines 45, 46, 47, and 48 at zero potential, diode gate 49 will provide an output at time $t_1$, as shown at H in FIG. 2; amplifier 38 will also have a positive output, providing the "not and" function, as seen at J of FIG. 2. Hence it can be seen that, in a similar manner, if lines 45 and 46 contain a signal and the other information lines are inactive, diode gate 50 and amplifier 39 will have an output;

also, if a signal appears on lines 47 and 48, and with information lines 43, 44, 45, and 46 inactive, diode gate 51 and amplifier 40 will have an output.

Since the information pulses on lines 43 and 44, 45 and 46, and 47 and 48 are never coincident, and since the output of the emitter follower and phase inverter are common to all diode gates, it can be seen that the presence of a signal on these information lines determines the amplifier which will be used as a signal path; signal routing of the information pulses is therefore determined by the presence or absence of the signal itself.

While a preferred embodiment of the invention has been described, numerous modifications may be performed on the circuit of FIG. 1 by anyone skilled in the art without departing from the spirit of the invention. The appended claim is therefore intended to cover and embrace any such modifications, limited only by the true spirit and scope of the invention.

What is claimed is:

A signal routing circuit, comprising a plurality of coincidence circuits, each having a plurality of inputs and one output; a multi channel source of non-coincident information signals, with a separate channel comprising one or more coincident information signals coupled to each concidence circuit; a source of gating signals, a differentiating circuit, and a monostable multivibrator, said differentiating circuit deriving an output pulse from said gating signal which is used to trigger said monostable multivibrator to provide a delay pulse, said delay pulse being applied to said coincidence circuits for the duration of said delay pulse period preventing passage of information signals for the length of the delay period, an integrating circuit connected to an emitter follower, said integrating circuit connected to said gating signal and said emitter follower connected to each coincident circuit to enable each coincident circuit for the duration of said gating signal period, the length of the gating signal period being longer than the length of the delay pulse period, means for enabling or inhibiting each coincident circuit by the information channel coupled to a particular circuit, thus selecting a path for the information signals.

References Cited by the Examiner

UNITED STATES PATENTS

| | | | |
|---|---|---|---|
| 2,794,123 | 5/57 | Younker | 329—55 |
| 2,837,642 | 6/58 | Schenck | 328—111 |
| 2,851,219 | 9/58 | Hussey | 307—88.5 |
| 2,995,664 | 8/61 | Deuitch | 307—88.5 |

OTHER REFERENCES

Pulse and Digital Circuits, Millman and Taub, McGraw-Hill, New York, 1956, pages 401–404.

ARTHUR GAUSS, *Primary Examiner.*